United States Patent [19]
Feistel, Jr.

[11] 3,901,278
[45] Aug. 26, 1975

[54] ALIGNMENT MEANS FOR PRESSURE TANK AIR BAGS OR THE LIKE

[75] Inventor: Robert B. Feistel, Jr., Oklahoma City, Okla.

[73] Assignee: W.H. Stewart Company, Oklahoma City, Okla.

[22] Filed: Jan. 14, 1974

[21] Appl. No.: 433,235

[52] U.S. Cl. ................. 138/30; 137/223; 152/427; 251/84
[51] Int. Cl. ............................................. F16l 55/04
[58] Field of Search .................. 138/30, 89.1–89.4; 137/223; 251/84; 152/415, 427–430

[56] References Cited
UNITED STATES PATENTS

| | | | |
|---|---|---|---|
| 2,349,321 | 5/1944 | White | 138/30 |
| 2,349,322 | 5/1944 | White | 138/30 |
| 2,378,467 | 6/1945 | DeKiss | 138/30 |

Primary Examiner—John W. Huckert
Assistant Examiner—Charles Gorenstein
Attorney, Agent, or Firm—Dunlap & Codding

[57] ABSTRACT

A pressure tank for storing a liquid is provided having an inflatable member suspended therein to supply pressure to the liquid in the tank. A misalignment device is provided for properly aligning the inflatable member within the tank during pressurization.

1 Claim, 2 Drawing Figures

PATENTED AUG 26 1975  3,901,278

ALIGNMENT MEANS FOR PRESSURE TANK AIR BAGS OR THE LIKE

BACKGROUND OF THE INVENTION

1. Field of the Invention

This invention relates generally to liquid pressure tanks having a flexible, inflatable member therein whereby pressure is applied to the fluid as air is introduced into the inflatable member. More particularly, but not by way of limitation, the invention relates to a device whereby the inflatable member within the liquid pressure tank remains properly aligned during the pressurization thereof.

2. Description of the Prior Art

Pressure tanks having an inflatable flexible member therein pressurized by means of compressed air are well known in the art as described in Bessemson U.S. Pat. No. 1,471,091, Mercier U.S. Pat. No. 3,387,598 and the Smith U.S. Pat. No. 3,625,256.

In the past, these inflatable members were aligned within the tank by means of a lip or flange supporting the inflatable member in the desired position so as to properly align the member with respect to the tank shell during inflation.

This construction restricted the accessibility of the inflatable member and increased the costs of construction and maintenance of the inflatable member and its attendant securing devices.

One object of the invention is to provide a means for aligning an independent inflatable member within a liquid pressure tank.

One other object of the invention is to provide an inflatable member within a liquid pressure tank which is more economical in the operation and construction thereof.

Other objects and advantages of the invention will be evident from the following detailed description when read in conjunction with the accompanying drawing which illustrates the preferred embodiment of the invention.

DESCRIPTION OF THE PREFERRED EMBODIMENT

Figure 1:
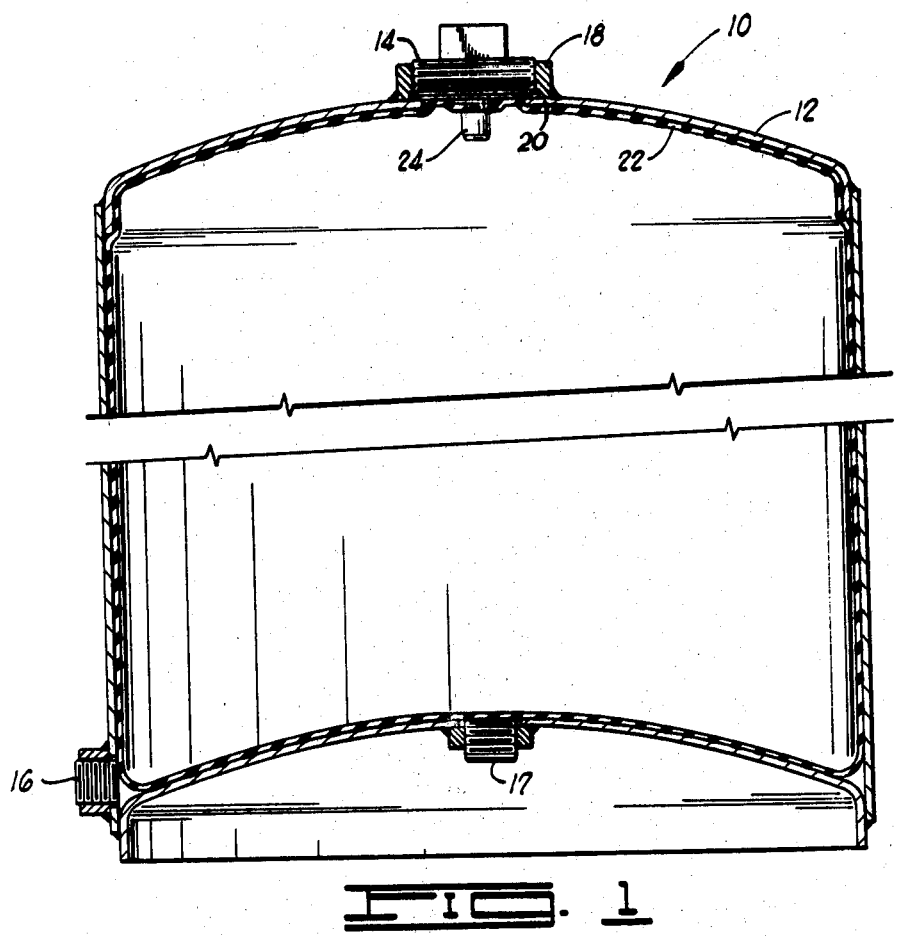
FIG. 1 is a partial sectional, partial elevational view of the pressure tank in an operating position.

Referring to the drawings in detail, and to FIG. 1 in particular, shown therein and designated by the general reference 10 is a pressure tank for holding a liquid under pressure. The pressure tank 10 is constructed having a shell 12 suitable for containing a liquid. The tank 10 also includes a valve assembly opening 14 in the upper surface thereof, a discharge opening 16, and an inlet opening 17. The valve assembly opening 14 is surrounded by a coupling 18 extending generally outwardly from the surface of the shell 12, the diameter of the opening 14 being generally smaller than the inside diameter of the coupling 18 creating a lip 20 of that portion of the shell 12 extending within the coupling 18 in a manner and for reasons to be made apparent below.

The tank 10 also includes an inflatable member 22 having a valve assembly 24 formed as a portion thereof. The inflatable member 22 is suspended inside the tank 10 such that, when inflated, the inflatable member 22 maintains pressure on liquid, such as water, stored in the tank for displacing the water through the discharge opening 16. The construction and utilization of various pressure tanks having an inflatable member therein, such as the pressure tank 10 generally described above, is well known in the art and a detailed description thereof is not required herein.

Figure 2:
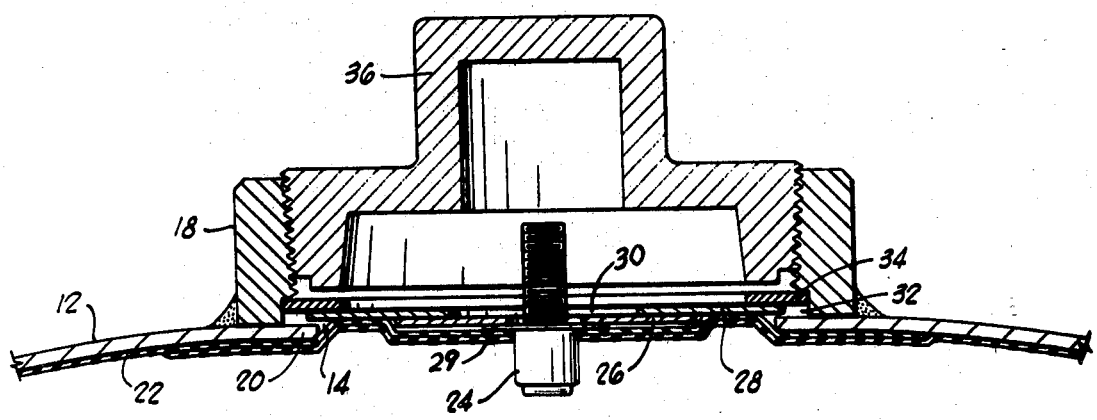
FIG. 2 is a partial sectional, partial elevational view of the alignment device in an assembled position.

As shown more clearly in FIG. 2, the inflatable member 22 is positioned in tank 10 with the threaded valve assembly 24 extending through a washer 26 and a washer 28. A flange 29 on the valve assembly 24 abuts the lower face of the washer 26. The washer 26 has an outside diameter less than the outside diameter of the washer 28, and the washer 26 has a larger outside diameter than the inside diameter of the washer 28. The inside diameter of the washer 26 is larger than the outside diameter of the valve assembly 24, such that in an assembled position, the valve assembly 24 is horizontally slidably disposed within a space 30 corresponding to the inside diameter of the washer 28.

The washer 28 is sized to fit inside the coupling 18 extending generally outwardly from the upper surface of the tank 10 and the washer 28 may abut the lip 20 of the shell 12.

A groove 32 is formed as a portion of the coupling 18 adjacent the lip 20, such that a snap ring 34 may be placed therein to secure the valve assembly 24 and the washer 26 and 28 in an assembled position within the valve assembly opening 14.

A cap 36 is threadable insertable within the coupling 18 such that, in an assembled position, the cap 36 protects the valve assembly 24 and washers 26 and 28, in a manner and for reasons to be made more apparent below.

OPERATION OF THE PREFERRED EMBODIMENT

The cap 36 is threadably removed from the coupling 18 to expose the valve assembly 24. A suitable air source is then utilized to inflatingly transmit a desired quantity of air to the inflatable member 22.

As the inflatable member 22 expands, the valve assembly 24 is movably disposed within the valve assembly opening 14 by means of the valve assembly 24 within the inside diameter of the washers 26 and 28.

A minimal quantity of air maintains the inflatable member 22 in an assembled position, with the flange 29 in contact with the washer 26, washer 26 in contact with washer 28, and washer 28 in contact with ring 34, such that the valve assembly will be maintained in a position for further inflation of the member 22, but will be held loosely in the opening 14 to permit some shifting of the member 22 without binding the valve assembly 24.

The inflatable member 22 may be removed for replacement or inspection by removing the snap ring 34 from the groove 32, thereby releasing the valve assembly 24 and alignment assembly from a secured position.

Changes may be made in the construction and the arrangement of the parts or the elements of the embodiment described herein without departing from the spirit and scope of the invention as defined in the following claims.

What is claimed is:

1. In a pressure tank having an inflatable member therein for retaining pressure on liquid stored in the tank, the inflatable member having a valve assembly thereon accessible through an opening in one wall of the tank, said opening being appreciably larger in diameter than the valve assembly and the valve assembly having a circumferential flange thereon, the improvement comprising:

a coupling secured to the exterior of the tank surrounding said opening, and ring means secured in the coupling sized to surround and abut the valve assembly to prevent the valve assembly from being removed from said opening when the inflatable member is at least partially inflated, said ring means comprising:

a snap ring secured in a mating groove in the interior of the coupling adjacent the respective wall of the tank;

a first washer abutting the side of the snap ring facing the tank; and a second washer abutting the side of the first washer facing the tank, the second washer having an outer diameter less than the outer diameter of the first washer but larger than the inner diameter of the first washer, and the second washer having an inner diameter greater than the outer diameter of the valve assembly and smaller than the diameter of the circumferential flange on the valve assembly;

whereby the valve assembly will be loosely held in the tank opening accessible through the coupling.

* * * * *